Patented Feb. 6, 1951

2,540,678

UNITED STATES PATENT OFFICE 2,540,678

FATTY ACID ALKYLOLAMINE CONDENSATION AND PRODUCTS

Maurice Joseph Kelley, Bloomfield, N. J., assignor to Nopco Chemical Company, Harrison, N. J., a corporation of New Jersey No Drawing. Application December 6, 1946, Serial No. 714,669

20 Claims. (Cl. 260—404.5)

1

The present invention relates to novel surface-active condensation products and the methods of preparing them.

In U. S. Patent 2,089,212, Kritchevsky disclosed the preparation of new hydrophilic agents by condensing at least two molecules of an alkylolamine with one molecule of a monobasic organic acid.

It has been discovered that the subsequent condensation with the aforementioned agents of one or more additional molecules of an organic acid forms a product of superior properties for many purposes. In addition the hydrophilic qualities of the product of the two condensations may be improved by a solubilizing treatment with an acid to form the acid addition product, or with an agent capable of forming a quaternary compound.

The novel compositions may be utilized widely as surface-active agents, emulsifiers and dispersing agents. Certain of these compounds are useful in the finishing of fibrous materials, such as textiles, paper and leather. As textile softeners, they not only impart a high degree of softness to fabrics and yarns, but also provide an unsurpassed resistance to yellowing of the goods. Other compounds of this new class possess utility as auxiliary agents in the production of viscose rayon, for the addition of relatively minor quantities to the spin bath prevents or greatly retards the deposition of foreign matter on the filaments and spinnerets. Some users find it advantageous to add the novel compositions to the viscose dope at an earlier stage of the manufacture of rayon. Some of the new products are excellent ingredients for the preparation of resin emulsions and in the emulsion polymerization of monomeric substances. Various compounds of the type disclosed herein may be employed as detergents, defoamers, anti-static agents, asphalt anti-stripping agents, fat-liquoring emulsifiers, synthetic waxes and the like.

An object of the invention is to provide novel condensation products from organic acids and alkylolamines.

A second object of the invention is to provide improved surface-active agents.

A third object of the invention is to provide a series of water-dispersible fatty condensation products.

A fourth object of the invention is to provide an improved textile softener.

Other objects of the invention will in part be obvious and in part appear hereinafter.

The present invention comprises a series of new compounds and methods of preparing them by an initial condensation of at least two molecules of an alkylolamine with one monobasic acyl radical containing at least six carbon atoms, and the subsequent condensation of one molecule of the initial condensation product with at least one monobasic acyl radical having at least two carbon atoms.

The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

In accordance with the invention one equivalent of a monocarboxylic acid, or a corresponding acylating derivative, is condensed at an elevated temperature with two moles of an alkylolamine. The product so obtained is condensed with one or more additional equivalents of a monocarboxylic acid, or a corresponding acylating derivative. Thereafter the product of the two condensations may be treated, if desired, with either an acid or a quaternizing agent, in order to increase its compatibility with water.

Although there is analytical evidence in support of the reactions set forth below, it is to be understood that the mechanism of the process is not completely understood and that the equations merely denote a theory of the various chemical changes. It is further to be understood that stearic acid, diethanol amine, diethyl sulfate and acetic acid are used merely for purposes of illustration in preparing the preferred product and not as limitations as to the scope of the invention. The initial condensation is believed to take place in two steps, producing first a fatty amide and thereafter a fatty amido amine.

(1a) 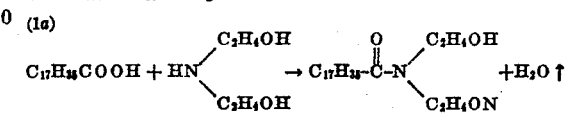

(1b) 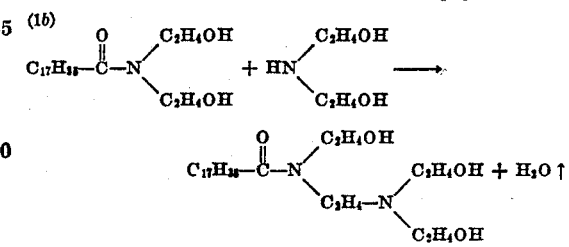

In a separate and distinct step this fatty amido amine is reacted with another acid radical in a further condensation.

(2)

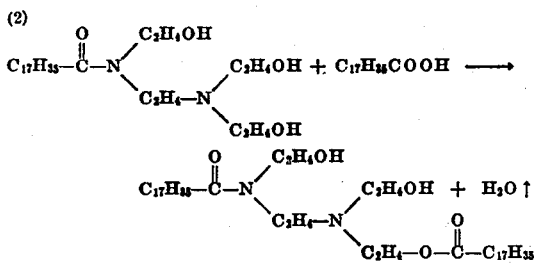

The reaction set forth in Equation 2 is herein denoted as the subsequent condensation step. It is important that it be understood that the compositions of this invention can only be prepared by condensations in two separate and distinct stages. An attempt to combine all of the reactions of Equations 1a, 1b and 2 into a single step by condensing the same total quantities of reactants, two moles of stearic acid and two moles of diethanolamine, at the same time, will merely yield the product of Equation 1a instead of the desired resultant of Equation 2. The product of Equation 2 may be quaternized as follows:

(3)

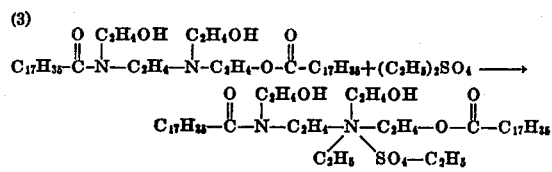

or it may be solubilized by an acetic acid treatment to produce the acid salt of the condensation product, as set forth in Equation 4.

(4)

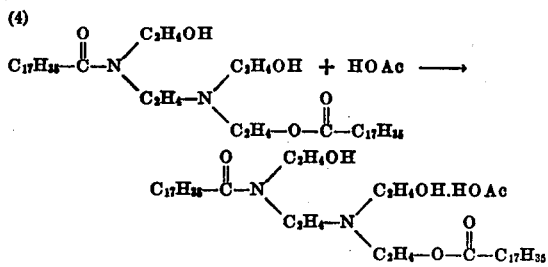

Any alkylolamine may be used in the initial condensation reaction including monoalkyl alkylolamines, dialkyl alkylolamines, and those derived from glycerine, sugar and other mono and polyvalent alcohols. Ethanolamine, diethanolamine, triethanolamine, butanolamine, isobutanolamine, pentanolamine, hexanolamine, laurylolamine, ethyl ethanolamine, diethyl ethanolamine, diisopropanolamine, cyclohexyl ethanolamine, N-phenyl ethanolamine, and 2-amino 2-methyl propanol-1 are only a few specific examples of those which may be employed. Diethanolamine is preferred, as it is readily available at a relatively low cost.

As for the acids employed in the two condensation steps, any organic acylating agent may be used; such as, a monocarboxylic acid, ester, amide, acyl halide, glyceride or substitution product of these compounds. Any acyl compound capable of forming an amide is suitable. While aliphatic acyl substances are usually preferred, cycloaliphatic, heterocyclic and aromatic acyl compounds may also be used. Although the acyl radical, itself, must be in the monobasic form, several of these may be combined in one molecule as in the case of di- or triglycerides. Where such glycerides or the like are used, it will be obvious that each acyl radical must be considered as a separate molecular equivalent in determining the proper proportions of the reactants in accordance with the information hereinafter disclosed. Appropriate acylating agents for the condensation reaction include, inter alia, acetic, propionic, butyric, caproic, caprylic, capric, undecylenic, lauric, myristic, stearic, palmitic, oleic, linoleic, ricinoleic, naphthenic, abietic, chlorohydroxy stearic, sulfonated oleic, 2-methyl hexanoic, benzoic, and quinaldine carboxylic acids; coconut, soybean, palm, tallow, fish, whale and other naturally occurring fats and oils as well as the fatty acids derived therefrom; sulfonic, halogen, nitro or hydroxy derivatives of these acids; methyl oleate and benzoyl chloride. The process is not only operative with pure acylating substances but also with various mixtures of such substances whether of natural or artificial occurrence.

Although certain lower fatty acids will react with an alkylolamine in the initial condensation step, the final product obtained is far less desirable than in the case of the higher fatty acids which are herewith defined as containing a minimum of 6 carbons in the acyl group. While it appears that extremely long chain carboxylic compounds are operative, fatty acyl compounds containing from 6 to 36 carbon atoms in the acyl radical are preferred for the intended purposes, and more particularly those having 10 to 22 carbon atoms in the carboxylic acid chain. These limitations as to content of carbon atoms are generally applicable to the alicyclic, heterocyclic and aromatic acyl compounds. Thus, there are limitations on the size of the acyl group condensed in the initial step of the process.

In the second or subsequent condensation reaction the same types of acyl compounds may be utilized as in the initial step. However, it is desirable here to include lower aliphatic acid compounds, and the general limits may be said to be from 2 to 36 carbon atoms in the second acyl group to be introduced into the condensation product. Nevertheless, higher fatty acylating agents are usually preferred here also, especially those containing from 10 to 22 carbon atoms in the monobasic acid radical.

To form a quaternary ammonium compound from the final condensation product, various quaternizing or alkylating substances may be employed; these include the lower alkyl esters of mineral acids as exemplified by the halides, sulfates, etc., of lower aliphatic substances. Specific examples include dimethyl sulfate, diethyl sulfate, methyl chloride, ethyl iodide, propyl bromide, and the like. Certain aromatic substances also serve the purpose as, for example, benzyl chloride and methyl p-toluene sulfonate. Although the alkylating or quaternizing agent is shown in Equation 3 above as attached only to the end nitrogen atom, it appears that lesser amounts of this agent may be added to any other amino groups when such are present with the exception of the amido nitrogen atom, that is the nitrogen attached to the carboxylic carbon atom. However, it is believed that attachment of the solubilizing substance to the end nitrogen atom is primarily effective in rendering the base compound soluble in water.

When acid addition rather than quaternization is chosen for solubilizing the condensation product, any known acid will produce the desired results in at least some degree, but better results are obtained with organic acids than with inorganic acids such as hydrochloric and sulfuric acids. Of the organic acids the lower aliphatic acids, as exemplified by acetic acid, are preferred.

Inasmuch as the initial condensation is the same as that set forth in Patent No. 2,089,212, the reaction conditions set forth there are applicable to the present invention. This is true of both condensation steps of the instant process. In brief, while the condensation may take place at temperatures slightly below 100° C., for practical results especially in regard to reaction time the temperature should preferably be above 100° C. and below the decomposition temperature of any substance present in the reaction mixture. Although condensations have been successfully performed at temperatures as high as 250° C., the best temperature range in general extends from 135 to 210° C. The time required for substantial completion of the reaction ranges from a few minutes up to as long as 20 hours. When the acylating agent is an acid or anhydride, the practical completion of the reaction may be determined by the decline in acid value of the mixture to its minimum, by the alkalinity of the mixture reaching its minimum value or by the termination of the evolution of water vapor therefrom. To facilitate the latter observation it is recommended that a reflux condenser equipped with a water trap be connected to the reaction vessel. Two of the above indicia are useless when an ester or oil is the source of the acyl radical, but completion of the reaction in this case is indicated by the alkalinity of the mixture attaining its minimum. In the second condensation the acylating agent may be either the same or a different substance from that used in the initial condensation. No separation of unreacted raw materials or side reaction products is necessary; hence the yields are substantially quantitative. In general the only substance removed during the condensing steps is the water formed. The initial condensation product is usually found to be closely similar in appearance to the product of the second condensation.

The initial condensation may advantageously be carried out in either one or a plurality of stages. In the first method, the fatty acid or similar material is mixed with the alkylolamine and condensed at the proper temperature and for the proper length of time. In the second method, one mole of alkylolamine may be first condensed with a fatty acid or similar material and the resulting product then condensed with an additional mole or more of alkylolamine and so on.

The condensations may be made in neutral solution or with the aid of condensing agents of either alkaline or acid character. The nature of such agents has an effect upon the reaction speed and the temperature required. However, it is preferred to omit such substances from the reaction mixture, as excellent products are obtained without the use of any condensing agents.

It will be appreciated that the compositions of this invention are not necessarily limited only to products resulting from the condensation of a mixture of alkylolamines and higher fatty acids in which the molal ratio of the former to the latter is at least 2 to 1 as reaction or condensation products which contain other substances in addition to substantial proportions of condensation products of the stated ratios of reactants are also within the scope of the invention. Thus, for example, a mixture of an alkylolamine and a higher fatty acid wherein the molal ratio of the alkylolamine to the higher fatty acid is say 1.5 or 1.8 to 1 may be condensed, in which case the products contain a substantial proportion of substances corresponding to the condensation product of a mixture of an alkylolamine and a higher fatty acid whose molal ratio is 2 to 1. As illustrative of such practice, I may condense two equivalent weights of a higher fatty acid or other acylating compound with three moles of an alkylolamine.

The following examples serve to illustrate the present invention and should not be construed as limitations thereon. All proportions are given in terms of parts by weight. It should also be understood that the ingredients may be of either chemically pure or commercial grades.

Example I

| | Parts |
|---|---|
| Stearic acid (triple pressed) | 77.4 |
| Diethanolamine | 28.7 |

Half of the above quantity of stearic acid was melted in a reaction vessel and the diethanolamine was then added. The molar ratio of acid to alkylolamine in the initial condensation thus was 1:2. A reflux condenser equipped with a water trap was employed and the reactants were heated to and maintained at 170 to 180° C. for about one hour until 3.6 parts of water had been collected in the water trap. The percentage alkalinity (in terms of KOH) at this time was found to be between 12 and 13%, and the acid value of the reaction mixture was less than 10. To perform the second condensation the balance of the stearic acid was added to the reaction vessel, making the molal ratio of reactants 1:1, and the temperature again raised to the 170 to 180° C. range for about two hours. At this time 2.5 additional parts of water had collected in the trap; the percentage alkalinity was found to be between 7.5 and 8.5%, and the acid value of the resultant mass was less than 10. The yield of the final condensation product was 100.0 parts. Both the intermediate and final condensation products were cream colored solids. The product of the two condensations was found to be useful as a textile softener of the cationic surface-active type, possessed of excellent softening power and outstanding resistance to yellowing.

| | Parts |
|---|---|
| Final condensation product | 83 |
| Diethyl sulfate | 17 |

The condensation product was heated with the diethyl sulfate to 65° C. in an open vessel for two hours to form the corresponding quaternary compound. This compound was a dark amber liquid which proved to be soluble in water.

Example II

| | Parts |
|---|---|
| Stearic acid | 568 |
| Diethanolamine | 210 |

One-half of the stearic acid was reacted with all of the diethanolamine for one hour at a temperature of 185–190° C. with the evolution of 26.2 parts of water. Then the remaining stearic acid was added, and the second condensation was also performed at 185–190° C. for one hour with the distilling off of 22.0 parts of water. The molar ratios of reactants in the two condensations were the same as in Example I, and the resulting cream colored solid likewise appeared to be identical.

| | Parts |
|---|---|
| Final condensation product | 17 |
| Acetic acid (glacial) | 3 |
| Water | 80 |

All ingredients were heated to about 65° C.; then the acid and water were mixed with the molten condensation product. The reaction mixture in an open vessel was maintained at the temperature mentioned and was stirred until a homogeneous mass resulted. Upon cooling a white paste resulted which was found to be easily dispersible in water. This solubilized acid salt of the condensation product proved to be a highly effective softener for textile fabrics when applied in the form of a dilute aqueous dispersion and superior to the softening materials now in use in respect to non-yellowing characteristics.

Example III

| | Parts |
|---|---|
| Capric acid | 346 |
| Diethanolamine | 210 |

One-half of the capric acid was condensed with the diethanolamine for one hour at a temperature of 190 to 195° C. with the splitting off of 26 parts of water. Thereafter the intermediate product was condensed with the remainder of the capric acid under the same reaction conditions and 20 grams of water were collected in the reflux condenser trap. Again the molal ratios of reactants of Example I were employed. The product was a light amber liquid.

Example IV

| | Parts |
|---|---|
| Caproic acid | 232.4 |
| Diethanolamine | 210.0 |

The first condensation of half of the caproic acid and all of the diethanolamine was performed at 180–185° C. for one and one-half hours; then the resultant was heated with the balance of the caproic acid to the same temperature for one hour. The ratios of reactants were identical with those in Example I. 29 and 18 parts of water, respctively, were distilled off during two reactions. Both the intermediate and final condensation products were liquids of a light amber color.

Example V

| | Parts |
|---|---|
| Oleic acid | 564 |
| Diethanolamine | 210 |

Two successive condensation reactions were employed, both taking place at 185 to 190° C. for one hour. In the first, all of the amine and one-half of the acid were used, and the water produced amounted to 26.5 parts. When the remaining acid was added to the intermediate reaction product, an additional 20.0 parts of water were condensed and removed. The molar ratios of reactants of Example I were followed. The resultant was a dark amber liquid.

Example VI

| | Parts |
|---|---|
| Coconut fatty acids | 400 |
| Diethanolamine | 210 |

The acylating substance here was obtained by splitting coconut oil in a conventional manner. The procedure followed was that of Example V, except that the quantities of water involved amounted to 26 and 20 parts, respectively. Both intermediate and final products proved to be light amber liquids.

Example VII

| | Parts |
|---|---|
| Coconut fatty acids | 220 |
| Diethanolamine | 210 |
| Oleic acid | 282 |

The coconut fatty acids and diethanolamine (1:2 mole ratio) were reacted for one hour at 185 to 190° C. with the production of 26 parts of water. The initial condensation product was thereafter condensed with the oleic acid (1:1 mole ratio) under the same conditions and 21 parts of water were collected. The final liquid product possessed a color approximating that of amber.

Example VIII

| | Parts |
|---|---|
| Oleic acid | 846 |
| Diethanolamine | 210 |

One-third of the acid was reacted with all of the amine (1:2 molar ratio) for one hour at 185 to 190° C. with the evolution of 26 parts of water. The resultant mass was further condensed with the remaining ⅔ of the oleic acid, the molal ratio of initial condensation product to oleic acid being 1:2, at the same temperature over a period of two hours. 42 parts of water were obtained from the trap. In this case a dark amber liquid was obtained.

Example IX

| | Parts |
|---|---|
| Oleic acid | 1128 |
| Diethanolamine | 210 |

In the first step, 282 parts or 1 mole of oleic acid and all of the amine (2 moles) were condensed in the same manner and with the same results as in Example VIII. Then the remaining 846 parts (3 moles) of the acid were added to the 1 mole of initial condensation product and the mixture heated to 185 to 190° C. for four hours during which 74 parts of water were driven off. Both the intermediate and final products were dark amber liquids.

Example X

| | Parts |
|---|---|
| Naphthenic acids (acid value 225) | 58.0 |
| Triethanolamine | 229.5 |
| 2-methyl hexanoic acid | 144.0 |

The naphthenic acids and alkylolamine (molal ratio about 1:6) were condensed for 60 minutes at a temperature of 220° C. and 13 parts of water were split off. In the subsequent reaction with the condensation product and 2-methyl hexanoic acid in a molar ratio of approximately 1:4, the temperature was maintained at 215° C. for 130 minutes, thereby splitting off 28 parts of water and yielding a reddish amber liquid product.

Example XI

| | Parts |
|---|---|
| Coconut fatty acids | 220 |
| Diethanolamine | 210 |

The mixture of acids was procured from the same source as in Example VI. The above ingredients were mixed in a molal ratio of 1:2 and heated to a temperature of 185 to 190° C. for one hour, water being evolved in a quantity amounting to 26 parts.

| | Parts |
|---|---|
| Initial condensation product | 80 |
| Acetic anhydride | 20 |

The proportions immediately above correspond to 1.7 equivalents of acetic acid per mole of the condensation product. The materials listed were mixed and heated first for five hours at 120° C. and then for an additional period of six hours to 150 to 160° C. By employing the low initial temperature in this reaction the losses of acetic acid through distillation were reduced. As the acetyl radical condensation progressed the temperature was increased without excessive losses. The 20 parts of aqueous distillate which collected in the water trap contained a small amount of acetic acid, but determination of this loss of acetic anhydride proved it to be negligible. The resulting product was a reddish amber liquid having an acid value of 8.1. It was found to be readily dispersible but not completely soluble in water.

*Example XII*

| | Parts |
|---|---|
| Abietic acid | 128.5 |
| Ethyl ethanolamine | 152 |
| Oleic acid | 120 |

The abietic acid and amine (1:4 molar ratio) were reacted for 200 minuts at 195° C. with the evolution of 11.6 parts of water. Thereafter, oleic acid was added to the reaction mass in a 1:1 molal ratio and the mixture heated to the same temperature for a period of 120 minutes thereby driving off 12.5 parts of water. The resultant proved to be a dark amber liquid.

*Example XIII*

| | Parts |
|---|---|
| Palm oil fatty acids | 131 |
| Diethanolamine | 105 |
| Methyl oleate | 148 |

The initial condensation between the palm oil fatty acids and the amine was substantially complete in 20 minutes at 200° C., 12.5 parts of water having been evolved. In the second stage of the process, methyl oleate was added to the product of the previous condensation, and the temperature was maintained at 150° C. for 100 minutes and then elevated to 230° C. for an additional 35 minutes. 18.0 parts of a mixture of methanol and water were collected. The molar ratios of reactants were the same as in Example I. The resultant was an amber colored slushy semi-solid mass.

*Example XIV*

| | Parts |
|---|---|
| Naphthenic acids (A. V. 225) | 232.0 |
| Diethanolamine | 93.5 |

The diethanolamine and half of the acids were reacted for 20 minutes at 200° C. producing 22 parts of water. The subsequent condensation of the remaining naphthenic acids with the intermediate was performed at the same temperature for 15 minutes driving off 11 parts of water and yielding a viscous reddish amber liquid. The molar ratios of reactants were identical with those of Example I.

*Example XV*

| | Parts |
|---|---|
| Chlorohydroxy stearic acid | 192.0 |
| 2-amino 2-methyl propanol-1 | 127.5 |
| Benzoyl chloride | 80.0 |

The substituted stearic acid and alkylolamine in 1:2.5 molal ratio were condensed at 200° C. for one hour with the evolution of 10.5 parts of water. The residue was then reacted with the benzoyl chloride (1:1 molar ratio) at 196° C. for two hours, but no distillate was collected in the trap in this step. It is thought likely that hydrogen chloride was formed and immediately combined with the amine. The product proved to be a dark brown solid.

*Example XVI*

| | Parts |
|---|---|
| Coconut oil | 110.0 |
| Diisopropanolamine | 193.0 |
| Sulfanated oleic acid (substantially water free) | 64.5 |

When the oil and amine were reacted at 170° C. for three hours no condensate accumulated in the trap. The ratio of equivalents of acyl groups to moles of the amine was 1:3. The glycerine formed in the reaction was not separated from the other reaction products. The second condensation was carried out at 190° C. for 1½ hours utilizing the initial reaction products and the sulfonated oleic acid (1:1 molal ratio) and producing 6.5 parts of water. The sulfonated acid had an original moisture content below 3%, as sulfonated materials of higher water content tend to split off SO₂ under the conditions of the reaction. The product was a reddish amber viscous liquid.

Since certain changes in carrying out the above process and certain modifications in the compositions which embody the invention may be made without departing from its proper scope, it is intended that all matter contained in the above description shall be interpreted as illustrative and not in a limiting sense.

It is also to be understood that the following claims are intended to cover all the generic and specific features of the invention herein described and all statements of the scope of the invention, which, as a matter of language, might be said to fall therebetween: and that they are intended to be inclusive in scope and not exclusive, in that if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having described my invention, what I claim as new and desire to secure by Letters Patent is:

1. A process which comprises initially condensing at least two molecules of an alkylolamine with each monobasic acyl radical containing from 6 to 36 carbon atoms in one molecule of an acylating compound comprising at least one of said radicals, and subsequently condensing one molecule of the product of the initial condensation with at least one monobasic acyl group having at least two carbon atoms in a molecule of an acylating compound comprising at least one of said groups.

2. A process which comprises initially condensing at least two molecules of an alkylolamine with each monobasic acyl radical containing from 6 to 36 carbon atoms in one molecule of an acylating compound comprising at least one of said radicals, subsequently condensing one molecule of the product of the initial condensation with at least one monobasic acyl group having at least two carbon atoms in a molecule of an acylating compound comprising at least one of said groups, and treating the product of said two condensations with a quaternizing agent to produce the corresponding quaternary ammonium compound.

3. A process which comprises initially condensing at least two molecules of an alkylolamine with each monobasic acyl radical containing from 6 to 36 carbon atoms in one molecule of an acylating compound comprising at least one of said radicals, subsequently condensing one molecule of the product of the initial condensation with at least one monobasic acyl group having at least two carbon atoms in a molecule of an acylating compound comprising at least one of said groups, and treating the product of said two condensations with an acid to produce the acid salt of the condensation product.

4. The process of claim 1 in which the two condensations are performed at temperatures between 100 degrees centigrade and the lowest decomposition temperature of any of the reactants and products.

5. The process of claim 1 in which the two condensations are performed at temperatures in the range extending from about 130 to about 230 degrees centigrade.

6. A process which comprises initially condensing at least two moles of an alkylolamine with one equivalent weight of an acylating compound having at least one monobasic acyl radical containing from 6 to 36 carbon atoms, and subsequently condensing one mole of the product of the initial condensation with at least one squivalent weight of an acylating compound having at least one monobasic acyl radical containing at least two carbon atoms.

7. A process which comprises initially condensing at least two moles of an alkylolamine with one equivalent weight of an acylating compound having at least one monobasic acyl radical containing from 6 to 36 carbon atoms, subsequently condensing one mole of the product of the initial condensation with at least one equivalent weight of an acylating compound having at least one monobasic acyl radical containing at least two carbon atoms, and treating the product of said two condensations with a quaternizing agent to produce the corresponding quaternary ammonium compound.

8. A process which comprises initially condensing at least two molecules of an alkylolamine with one molecule of a fatty acid containing from 10 to 22 carbon atoms, and thereafter condensing one molecule of the resultant condensation product with at least one molecule of a fatty acid containing from 2 to 22 carbon atoms per molecule.

9. A process which comprises initially condensing at least two molecules of an alkylolamine with one molecule of a fatty acid containing from 10 to 22 carbon atoms, thereafter condensing one molecule of the resultant condensation product with at least one molecule of a fatty acid containing from 2 to 22 carbon atoms per molecule, and treating the product of said two condensations with an alkyl ester of a mineral acid to form the quaternary ammonium salt of the condensation product.

10. A process which comprises initially condensing at least two molecules of diethanolamine with one molecule of stearic acid, and thereafter condensing one molecule of the resultant condensation product with at least one molecule of stearic acid.

11. A process which comprises initially condensing at least two molecules of diethanolamine with one molecule of stearic acid, thereafter condensing one molecule of the resultant condensation product with at least one molecule of stearic acid, and treating the product of said two condensations with diethyl sulfate to form the quaternary ammonium salt of the condensation product.

12. A process which comprises initially condensing at least two molecules of an alkylolamine with each monobasic acyl radical containing from 6 to 36 carbon atoms in one molecule of an acylating compound comprising at least one of said radicals, subsequently condensing one molecule of the product of the initial condensation with at least one monobasic acyl group having at least two carbon atoms in a molecule of an acylating compound comprising at least one of the said groups, and treating the product of said two condensations with a solubilizing agent selected from the group consisting of quaternizing agents and salt forming acids.

13. A condensation product having the formula

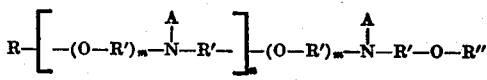

wherein R is an acyl group containing from 6 to 36 carbon atoms and is selected from the group consisting of substituted and unsubstituted aliphatic, cycloaliphatic, heterocyclic and aromatic acyl groups; R' is a divalent radical selected from the group consisting of substituted and unsubstituted alkylene and cyclic sugar groups containing from 2 to 12 carbon atoms with each R' being selected from the above group independently of every other R'; R'' is an acyl group containing from 2 to 36 carbon atoms and is selected from the group consisting of substituted and unsubstituted aliphatic, cycloaliphatic, heterocyclic and aromatic acyl groups; A is selected from the group consisting of —R'—O—R'', hydrogen and alkyl, alkylol and acyl groups containing from 2 to 36 carbon atoms with A when it is an acyl group being selected from the group consisting of substituted and unsubstituted aliphatic, cycloaliphatic, heterocyclic and aromatic acyl groups; m is a number selected from the group consisting of 0 and 1; and n is a small whole number.

14. A condensation product having the formula

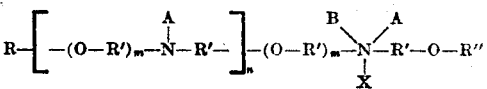

which is the reaction product of the product of claim 13 and a solubilizing agent having the formula BX wherein X is an anion and B is selected from the group consisting of hydrogen, the benzyl radical, and lower alkyl radicals.

15. The condensation product of claim 13 wherein R is an aliphatic acyl group containing from 10 to 22 carbon atoms and R'' is an aliphatic acyl group containing from 2 to 22 carbon atoms.

16. A condensation product having the formula

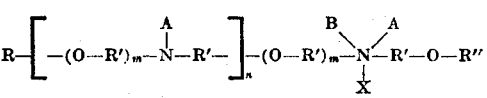

which is the reaction product of the product of claim 15 and a solubilizing agent having the formula BX wherein X is an anion and B is selected from the group consisting of hydrogen, the benzyl radical, and lower alkyl radicals.

17. A condensation product having the formula

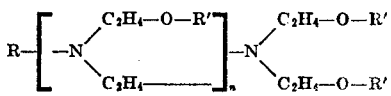

wherein R is an aliphatic acyl group containing from 10 to 22 carbon atoms, R' is selected from the group consisting of hydrogen and an aliphatic acyl group containing from 2 to 22 carbon atoms with at least one R' being an aliphatic acyl group, and $n$ is a small whole number.

18. A condensation product having the formula

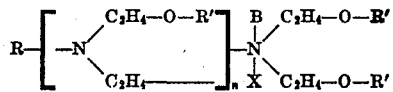

which is the reaction product of the product of claim 17 and a solubilizing agent having the formula BX wherein X is an anion and B is selected from the group consisting of hydrogen, the benzyl radical, and lower alkyl radicals.

19. A condensation product having the formula

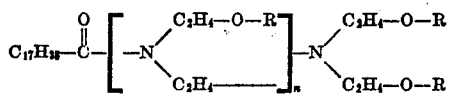

wherein R is selected from the group consisting of H and aliphatic acyl groups containing from 2 to 22 carbon atoms with at least one R being an aliphatic acyl group, and $n$ is a small whole number.

20. A condensation product having the formula

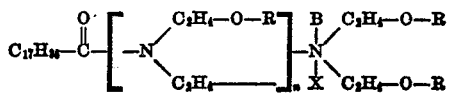

which is the reaction product of the product of claim 19 and a solubilizing agent having the formula BX wherein X is an anion and B is selected from the group consisting of hydrogen, the benzyl radical, and lower alkyl radicals.

MAURICE JOSEPH KELLEY.

REFERENCES CITED

The following references are of record in the file of this patent:

UNITED STATES PATENTS

| Number | Name | Date |
| --- | --- | --- |
| 2,089,212 | Kritchevsky | Aug. 10, 1937 |
| 2,268,395 | Henke et al. | Dec. 30, 1941 |
| 2,290,881 | Katzman | July 28, 1942 |
| 2,334,852 | Weisberg et al. | Nov. 23, 1943 |
| 2,345,570 | Bley | Apr. 4, 1944 |
| 2,388,281 | Orelup | Nov. 6, 1945 |
| 2,425,393 | Robinson et al. | Aug. 12, 1947 |